United States Patent [19]

McWilliams et al.

[11] 3,865,135

[45] Feb. 11, 1975

[54] HYDRAULIC CONTROL VALVE FOR FLUID SUSPENSION SYSTEM

[75] Inventors: Orcenith D. McWilliams, Morris; Roger A. Rice, Joliet, both of Ill.

[73] Assignee: Caterpillar Tractor Co., Peoria, Ill.

[22] Filed: Oct. 9, 1973

[21] Appl. No.: 404,309

Related U.S. Application Data

[62] Division of Ser. No. 286,025, Sept. 5, 1972, Pat. No. 3,797,140.

[52] U.S. Cl. ......... 137/596.14, 137/596.18, 91/461, 280/489 R, 267/64 R
[51] Int. Cl. ........................ B60d 1/00, F16k 11/00
[58] Field of Search.......... 137/596, 596.14, 596.12, 137/596.13, 596.1, 596.2, 625.69, 624.27, 102; 267/64 R, 64 A, 64 B, 65 R, 65 D, 124, 126; 280/489; 37/129, 126 R; 91/414

[56] References Cited
UNITED STATES PATENTS

3,311,389  3/1967  Barton et al. .................... 267/64 R
3,450,418  6/1969  Rice .............................. 280/489 X

*Primary Examiner*—Martin P. Schwadron
*Assistant Examiner*—Robert J. Miller
*Attorney, Agent, or Firm*—R. E. Walters

[57] ABSTRACT

A hydraulic control valve including a valve body having an inlet port, first and second outlet ports and a return port with a first movable valve element for selectively and alternately communicating the inlet port with the first outlet port and the return port and a second movable valve element for selectively controlling communication between the first and second outlet ports and a third movable valve element for selectively controlling communication of the second outlet port with the return port when communication between the outlet ports is blocked.

9 Claims, 6 Drawing Figures

FIG_5_

Fig. 6.

HYDRAULIC CONTROL VALVE FOR FLUID SUSPENSION SYSTEM

This is a division, of Ser. No. 286,025, filed 9-5-72, now U.S. Pat. No. 3,797,140.

BACKGROUND OF THE INVENTION

Hydropneumatic suspension hitches for coupling a two wheel tractor with a scraper unit or the like have met with increasing acceptance because of their ability to control pitch and bounce in such vehicles in both the loaded and unloaded condition. U.S. Pat. No. 3,311,389, issued to Barton et al., and U.S. Pat. No. 3,449,845, issued to Jessen et al., are illustrative of hydropneumatic suspension hitches of this type. The theory and operation of such hydropneumatic suspension hitches are best described in U.S. Pat. No. 3,311,389 which is hereby incorporated by reference for a complete understanding of this invention.

Improved riding qualities are obtained in tractor-scraper combinations with the hydropneumatic suspension systems described in the above patents. However, the control valves of such systems must be highly sophisticated and precision manufactured in order for the hitches to operate properly under all field operating conditions. For example, actuating a particular system for a temporarily fixed lockout condition to permit lowering of the hitch to a mechanical stop at a desired controlled rate requires precise dual rate metering of flow at both ends of the fluid suspension motor of the system. To accomplish this control it is necessary to meter flow out of the lower or cushioning end of the fluid suspension motor to allow the hitch to lower. Simultaneously, pressure fluid from suspension system must be metered into the upper end of the fluid suspension motor at a slower rate than fluid is metered from the lower end of the suspension motor. This dual rate metering is necessary to prevent pressure fluid in the upper end of the suspension motor from driving the hitch downward to mechanical stops which could result in excessive stresses in the hitch structure.

Additionally, complex and costly pilot controlled leveling valves with double-acting fluid damping capabilities have been employed by the prior art to prevent operation of the leveling valve during normal dynamic motion of the machine when traveling over rough terrain. Such unnecessary repetitive energizing or "hunting" of the leveling valve adversely affects the life of the system's components and is also detrimental to the function of the suspension system as a tuned and damped vibration absorber.

SUMMARY AND OBJECTS OF THE INVENTION

Accordingly, it is an object of this invention to provide an improved fluid suspension system of greatly simplified construction and which is capable of more efficient operation than presently available suspension systems.

Another object of this invention is to provide a fluid suspension system wherein simplified fluid metering is accomplished by a single orifice to control lowering of the hitch to a temporarily fixed lockout condition.

Another object of this invention is to provide a fluid suspension system which utilizes a double acting fluid suspension motor wherein the cushioning end is constantly pressurized in both of its operating conditions.

Other objects and advantages of the present invention will become more readily apparent upon reference to the accompanying drawings and following description.

DESCRIPTION OF THE PREFERRED EMBODIMENTS

Figure 1:
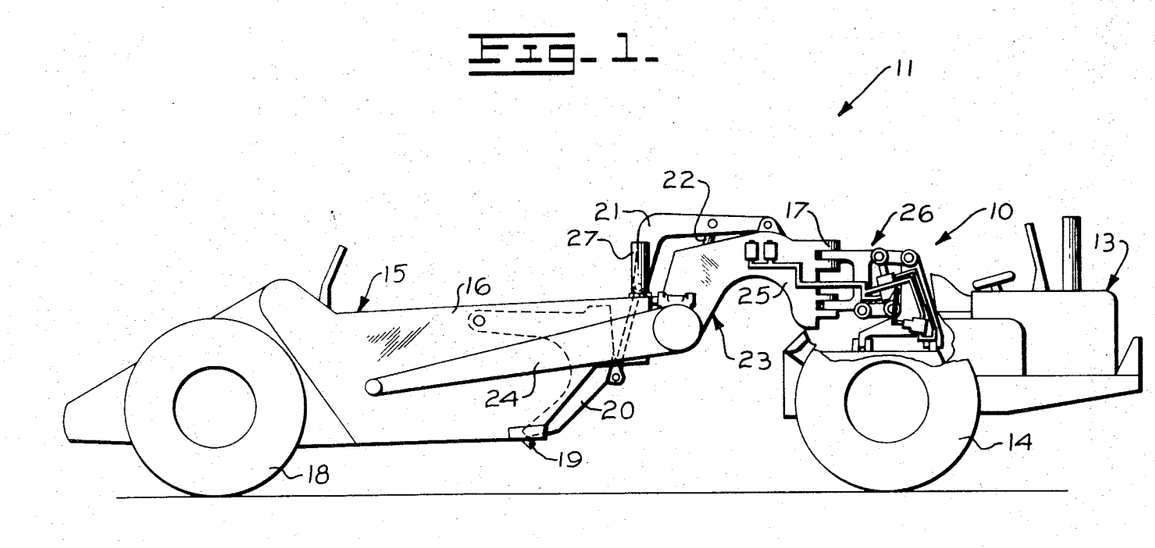
FIG. 1 is an elevation of a two wheel tractor and an earthmoving scraper combination connected through a hydropneumatic suspension hitch with the instant fluid suspension system incorporated therein.

Referring more particularly to the drawings, a fluid suspension system embodying the principles of the present invention is generally indicated by the reference numeral 10 and is illustrated in FIG. 1 thereof as operatively associated with an articulated vehicle 11. The forward portion of the vehicle is depicted as a two-wheel tractor generally indicated at 13 which is mounted on a pair of rubber tired wheels 14. The rear portion of the vehicle is illustrated as an earthmoving scraper generally indicated at 15 and has a bowl 16 which is supported for oscillation about the axis of rotation of a pair of rubber tired wheels 18.

The bowl 16 is a box-like forwardly opening material carrying receptacle having a cutting edge 19 disposed transversely along the lower leading edge thereof. An apron 20 is pivotally supported on the bowl for closing and opening the forward end thereof to control the entry and exit of dirt or other material over the cutting edge. A suitable linkage system 21 under control of a hydraulic jack, a portion of which is shown at 22, is provided for elevational adjustment of the apron between open and closed positions.

A draft frame 23 includes a pair of laterally spaced draft arms 24 pivotally connected to opposite sides of the bowl 16, and a forwardly extending centrally disposed arched goose-neck 25 articulately connected to the tractor 13 by means of a hydropneumatic suspension hitch 26. A pair of bowl lift jacks, one of which is shown at 27, are pivotally supported on the draft frame for elevationally adjustable support of the forward end of the bowl.

Figure 2:
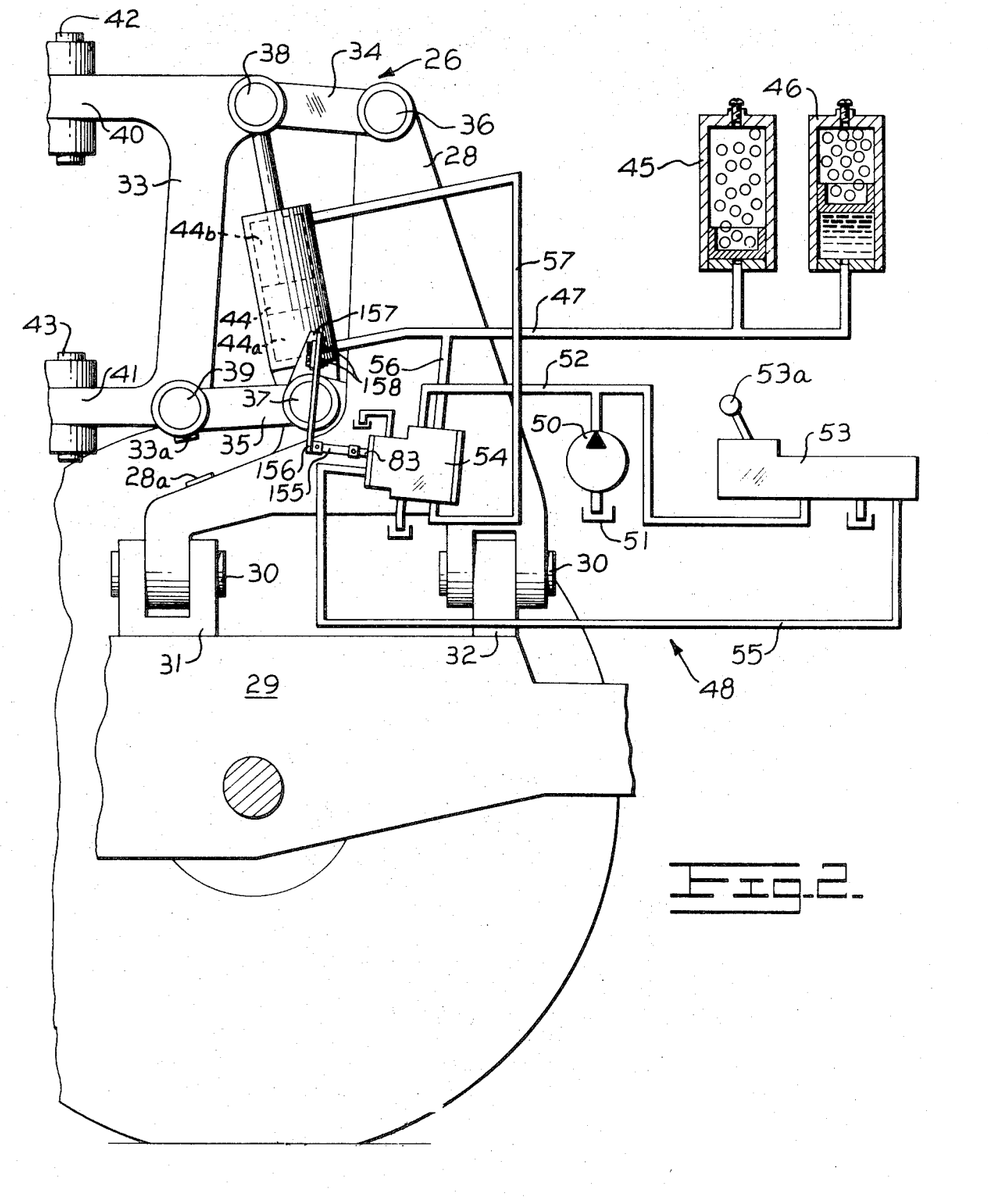
FIG. 2 is an enlarged broken-away elevation of the hydropneumatic suspension hitch with parts of its hydraulic circuit schematically illustrated.

The hydropneumatic suspension hitch 26 is more clearly illustrated in FIG. 2 and includes an A-frame 28 centrally mounted on a main frame 29 of the tractor 13 in substantially upright aligned relation with the longitudinal axis of the tractor. The A-frame is pivotally secured on the frame with pins 30 through lugs 31 and 32 which allow the A-frame to swing about a generally horizontal pivot axis through the pins. A stop 28a is provided on the A-frame to limit downward movement of the hitch. A suspension bracket 33 is connected to the A-frame by a pair of vertically spaced generally horizontally disposed links 34 and 35. The bracket 33 includes a stop 33a for engagement with the stop 28a. The links have their respective forward ends pivotally connected to the A-frame 28 by pins 36 and 37 respectively and their rearward ends are pivotally connected to the suspension bracket by a pair of pins 38 and 39, respectively.

Suspension bracket 33 includes a pair of upper and lower rearwardly extending mounting ears 40 and 41 for a pivotal connection with the forward end of the gooseneck 25 by a pair of vertically disposed pivot pins 42 and 43 forming an articulation joint about which the vehicle is steered.

Since the suspension bracket 33 can move vertically with respect to the tractor 13 and the A-frame 28 due to the pivotal connection therebetween through links 34 and 35, a cushioning jack or double acting fluid suspension motor 44 is diagonally coupled between the pivots 37 and 38. Cushioning jack 44 is of the normal piston-cylinder type defining therein a head end or cushioning chamber 44a and a rod or opposite end chamber 44b and forms a part of the fluid suspension system 10. The head end chamber of the cushioning jack is in constant fluid communication with a pair of pneumatic accumulators 45 and 46 by way of a line 47 during all modes of operation.

The provision of different gas pressure preloads in the accumulators 45 and 46 provides the proper cushioning conditions for either a loaded or empty scraper condition. Since the load in the scraper 15 will vary and hence the vertical position of the suspension bracket 33 will vary accordingly, it is desirable to permit the admission to or venting of fluid from the fluid suspension system to maintain a preselected vertical relationship between the tractor 13 and the scraper.

Control of the fluid suspension system 10 is accomplished by a control circuit indicated generally at 48. The control circuit includes a pump 50 adapted to draw fluid from a reservoir 51 for supply through a line 52 to a manual selector valve 53 and a simplified relatively low cost control valve 54. The manual selector valve has two positions for alternately and selectively establishing a cushion ride condition or a lockout condition of the suspension system by controlling communication of pilot pressure through a line 55 to the control valve 54.

The internal components of the selector valve 53 are identical with the selector valve illustrated in U.S. Pat. No. 3,511,276 and needs no further amplification other than to indicate that it connects line 55 either to pump pressure or drain as dictated by the position of a control lever 53a.

Valve 54 communicates with the cushioning chamber 44a of the jack 44 and the accumulators 45 and 46 by way of a line 56 and the line 47. The valve also communicates by way of a line 57 with the opposite end chamber 44b of the jack.

Figure 3:
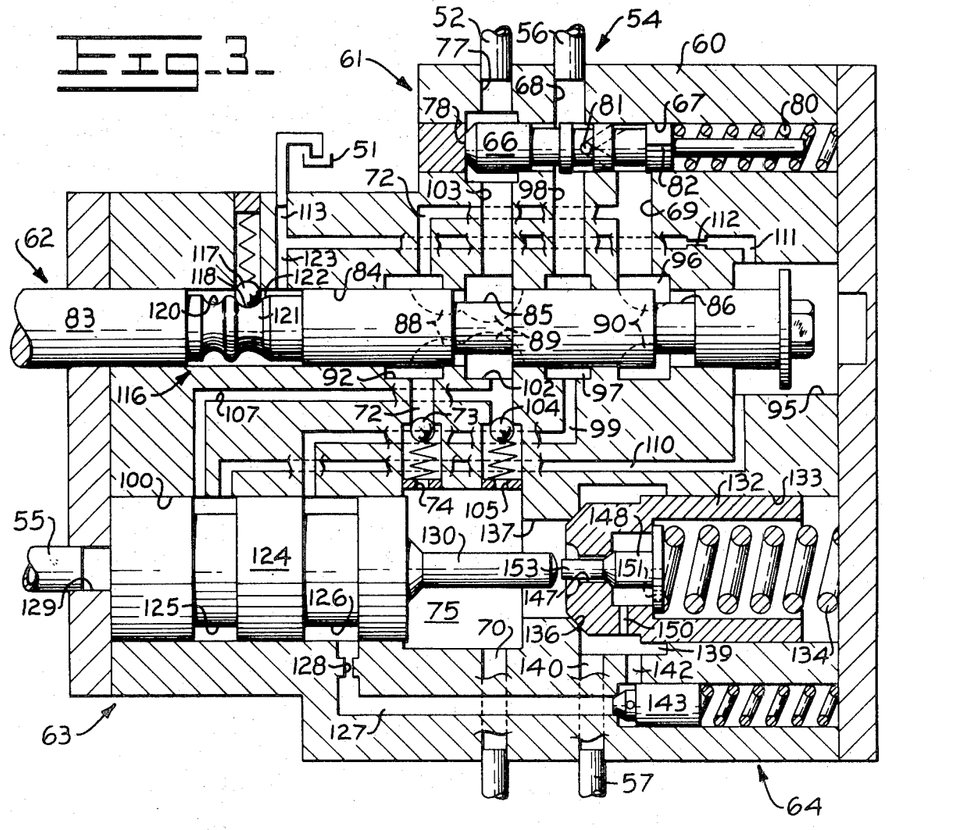
FIG. 3 is a section through the low-cost control valve illustrated in FIG. 1.

Referring more particularly to FIG. 3, the valve 54 includes a body 60 having a safety valve section 61, a leveling valve section 62, a lockout valve section 63, and a vent valve section 64.

The safety valve 61 includes a spool 66 disposed for reciprocation in a bore 67 to control communication between a cushioning port 68 and a passage 69 which communicates with a tank return port 70 by way of a passage 72, a restrictor check valve 73, an orifice 74 and a return chamber 75. One end of bore 67 communicates with a pump inlet port 77 so that an end 78 of the spool 66 is exposed to the pressure in the pump line 52 in opposition to the bias of a spring 80. A drilled passage 81 in spool 66 provides communication between the cushioning port 68 and the passage 69 when the spool 66 is in the position shown. The chamber of spring 80 is vented to the passage 69 and hence to the reservoir by way of a slot 82 in the spool 66.

The leveling valve section 62 includes a leveling spool 83 disposed for reciprocation in a bore 84 defined by the housing 60. The spool 83 includes a pair of grooves 85 and 86 which in cooperation with a plurality of metering slots 88, 89 and 90 selectively control fluid communication between the pump inlet port 77, the cushioning port 68, the passage 69 and an annulus 92 communicating with the check valve 73.

One end of spool 83 projects into a chamber 95 formed at one end of the bore 84 with the other end of the spool projecting outwardly of body 60 for connection through appropriate linkage with the suspension hitch 26, as will hereinafter be described. The bore 84 further includes an annulus 96 which communicates by way of passage 69 with the bore 67 of the safety vent valve 61, an annulus 97 which communicates with the bore 67, and cushioning port 68 by way of a passage 98 and also communicates by way of a passage 99 with a bore 100 in the lockout valve section 63. An annulus 102 communicates by way of a passage 103 with the bore 67 and pump inlet port 77 and also communicates through a high pressure relief valve 104 and an orifice 105 with the tank return chamber 75. The annulus 102 further communicates through a passage 107 with the bore 100 at a point axially spaced from the passage 99. The bore 100 also communicates by way of a passage 110 with the chamber 95 which further communicates through a passage 111, an orifice 112 and a passage 113 to the reservoir 51.

A mechanical detent generally indicated by the reference numeral 116 has a spring biased ball 117 cooperating with a groove 118 to establish a neutral centered position for spool 83. A second groove 120 in the spool cooperates with the ball to releasably lock the spool in a raise position communicating the pump inlet port 77 with the cushioning port 68. A pair of contiguous cam surfaces 121 and 122 on the right hand side of groove 118 cooperate with ball 117 when the spool 83 is moving toward or returning from a lower position to provide essentially a snap action of the valve spool. The cam surfaces are conical with the outer cam 122 remote from the groove being less oblique to the longitudinal axis of spool 83 than the inner cam 121 which is contiguous to the groove, in order to increase the valve spool centering forces as the spool approaches its centered neutral position. The detent area around the spool is vented to the tank 51 by way of a passage 123 and the passage 113.

The lockout valve section 63 provides a spool 124 movably disposed in the bore 100 and includes a pair of grooves 125 and 126. The groove 125 selectively controls communication between the passages 107 and 110, depending upon the positioning of the spool. The groove 126 controls communication between the passage 99 and a passage 127 which communicates between the bore 100 and the vent valve section 64. The passage 127 includes an orifice 128 to control the rate of fluid flow to the vent valve as will later be more fully explained.

A pilot actuating chamber 129 formed at one end of spool 124 communicates with the line 55 which may be selectively pressurized or vented by the selector valve 53 to control the position of the spool 124. The spool further includes an actuating extension 130 extending axially toward the vent valve section 64.

The vent valve section 64 includes a poppet type check valve 132 disposed for reciprocation in a bore 133 and is biased by a spring 134 into sealing engagement with a conical seat 136. The conical seat defines the juncture between a passage 137 communicating between the tank return chamber 75 and an annulus 139 provided in the bore 133. The annulus 139 is in open communication with a lockout port 140 and communicates via a passage 142 and a check valve 143 with the passage 127 and through the orifice 128 with the bore 100 of the lockout valve 63. The check valve 143 is spring biased to a closed position, as shown in FIG. 3, to normally block flow from the annulus 139 toward bore 100 and yet permit relatively free flow from the orifice 128 toward the annulus 139.

A central passage 147 formed in one end of the check valve 132 is normally closed by a spring biased poppet 148 to permit equalization of pressure between the lockout port 140 and the chamber of the spring 134 behind the check valve 132 by way of an orifice 150 and a passage 151. The poppet includes an actuating stem 153 which extends outwardly of the check valve 132 in engagable coaxially aligned relation to the actuating extension 130 of the spool 124.

As is best shown in FIG. 2, the outwardly extending end of the leveling spool 83 is pivotally connected by a link 155 to the free end of a leaf spring 156 which has its outer end secured to a bracket 157 by a plurality of bolts 158. The bracket 157 is rigidly secured to the link 35 so that as the bracket 33 moves vertically by pivotal movement of the links the spring exerts an actuating force on the spool 83 depending on the direction of hitch movement. This resilient linkage in cooperation with mechanical detent 116 permits limited hitch movement without actuation of the leveling spool 83 to minimize the frequency at which the leveling circuit is energized. As a result, pressure loading of the pump and other circuit components due to dynamic bouncing of the hitch during travel operations of the vehicle is minimized.

SECOND FORM

Figure 5:
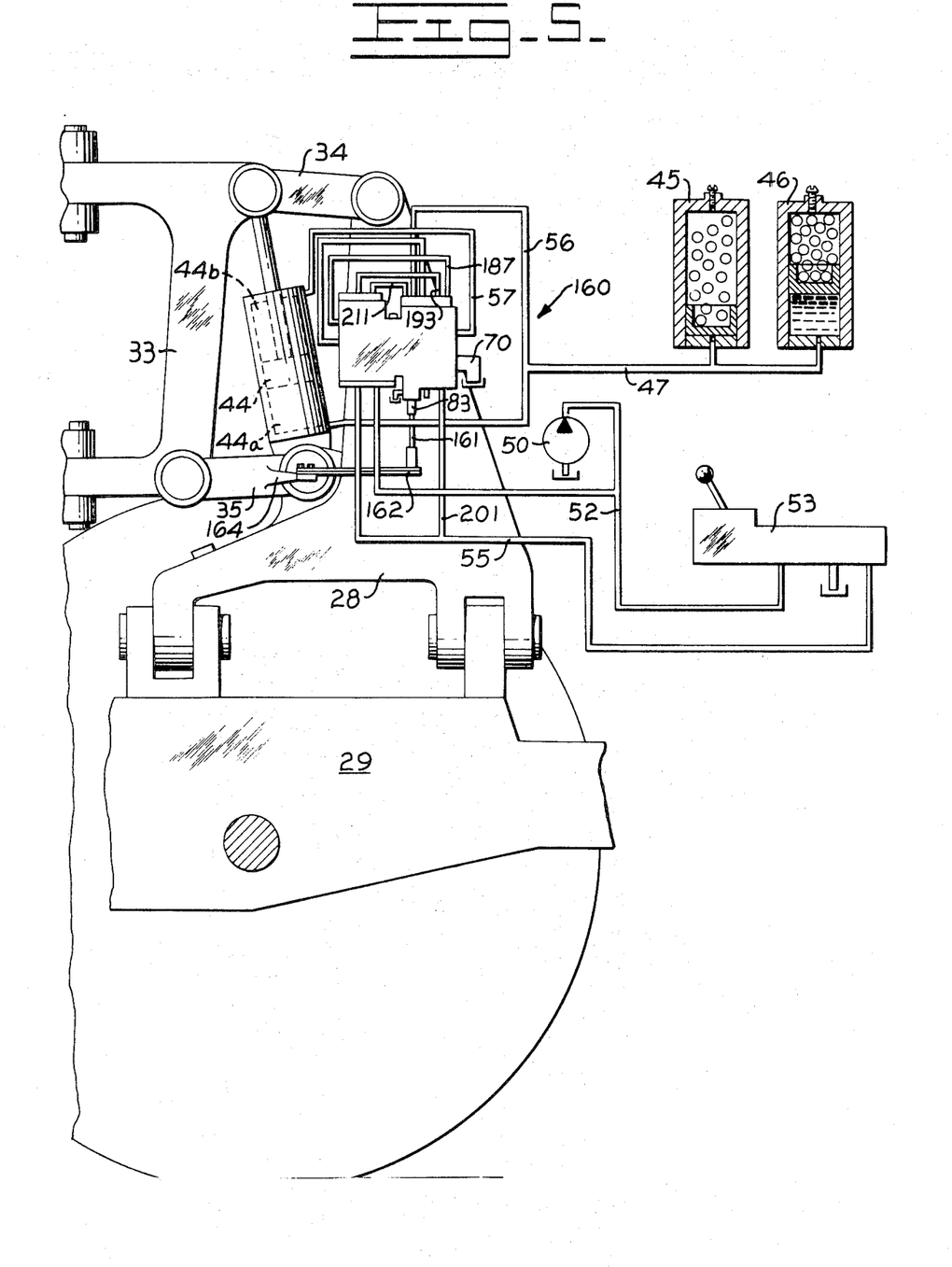
FIG. 5 is an enlarged broken away section of the suspension hitch with an alternate control valve oriented differently on the A-frame.
Figure 6:
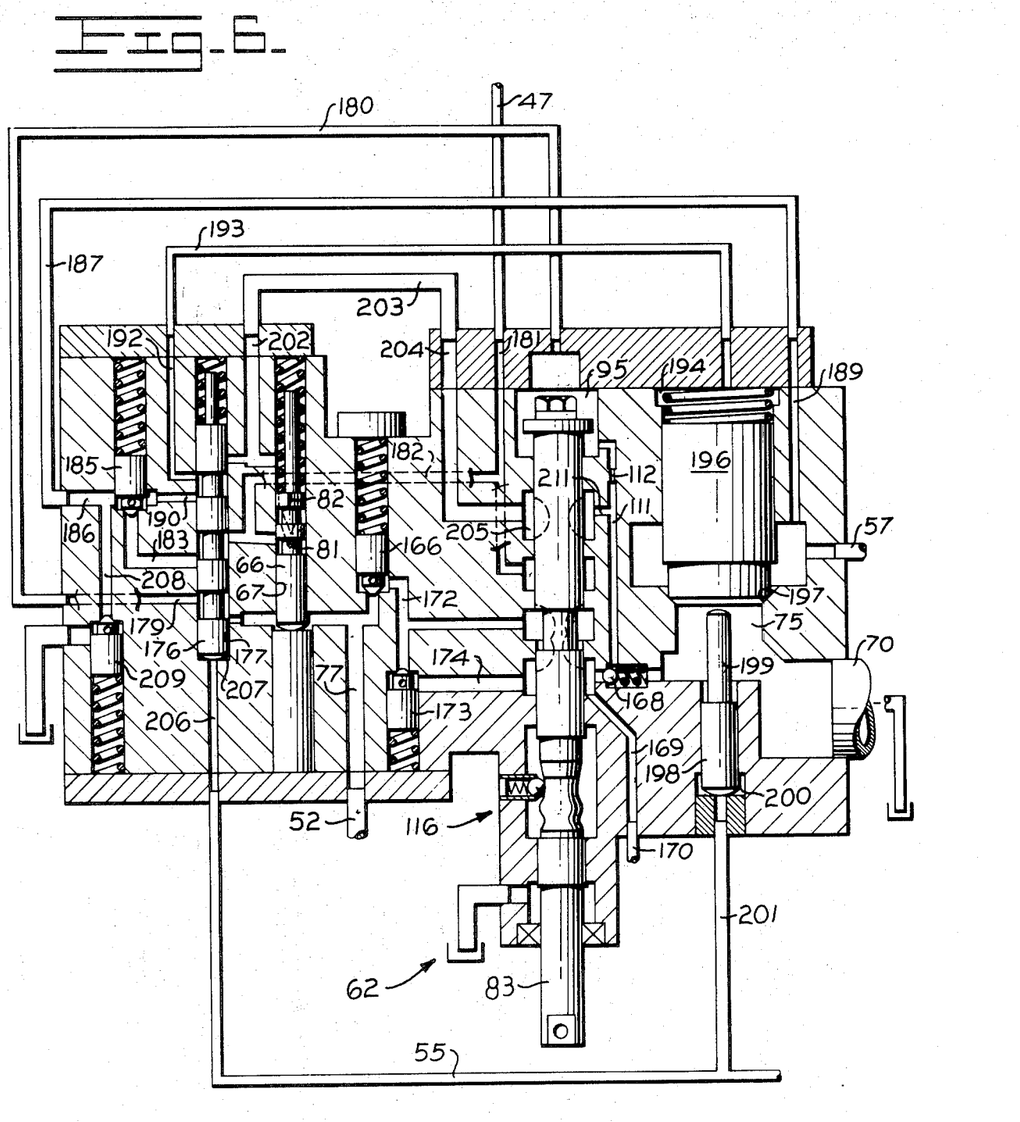
FIG. 6 is a section through the alternate low-cost control valve shown in FIG. 5.

An alternate embodiment of the present invention is illustrated in FIGS. 5 and 6 wherein a modified form of control valve indicated generally at 160 is supported for pivotal connection through a link 161 to the free end of a generally horizontally disposed leaf spring 162. The opposite end of the leaf spring is secured to a bracket 164 integrally formed with the lower link 35. With this arrangement vertical movement of the bracket 33 by pivotal swinging of the links 34 and 35 imparts an actuating force through the spring 162 to the leveling valve spool 83 of the control valve 160 which is fixedly mounted with respect to the A-frame 28.

The fluid connection of control valve 160 to the cushioning jack 44, accumulators 45 and 46, pump 50, and selector valve 53 is substantially the same as in the previously described embodiment.

The internal design of the control valve 160, as is best disclosed in FIG. 6, has been modified as compared with the design of the control valve 54 disclosed in FIG. 3. As best shown in FIG. 6, pump line 52 communicates with the pump inlet 77 which in turn communicates with one end of the bore 67 so that the safety spool 66 is responsive to pump pressure in the pump inlet. The drilled passages 81 and the slots 82 in safety spool 66 serve to vent the accumulators when the system is inactive.

The inlet port 77 also communicates through a relatively low pressure restrictor valve 166 which is disposed in series with a second low pressure restrictor valve 168 when the leveling spool 83 is in the neutral position as illustrated. The series arrangement of the restrictor valves maintains the pilot pressure required in the inlet 77 for actuation of the safety valve 66 and pilot positioning of the leveling valve 83 by pressurization of chamber 95. This series arrangement of two restrictor valves permits a second pilot or control pressure somewhat lower than that required in inlet port 77 to be provided by the restrictor valve 168 for supply through a passage 169 and a line 170 for use external of the control valve 160. The valve 166 also prevents the reverse flow from line 47 to passage 172, pressurizing the end of stem 66. This could happen when the engine is shut down, as pressure in the chamber 95 decreases, allowing the spool 83 to shift upward, connecting accumulator to pump, thus pressurizing passage 77. Under these conditions, the spool 66 will not return to the vent position shown and the accumulators will not be vented.

The pump inlet port 77 also communicates through a passage 172, a relief valve 173, a passage 174, and the restrictor valve 168 to the tank return chamber 75 from where it is returned to the reservoir by way of a tank return port 70.

The leveling valve section 62, including the spool 83, is substantially identical to that previously described with respect to FIG. 3. The mechanical detent mechanism 116 is associated with spool 83 for controlling positioning of the spool in response to vertical movement of the bracket 33 and a resultant spool actuating force transmitted through the leaf spring 162.

A lockout valve spool 176 is reciprocably disposed in a bore 177 and is spring biased to the position shown to communicate pump inlet port 77 to the chamber 95 by way of a passage 179 and a line 180. The chamber 95 communicates via an orifice 112 and a passage 111 to the spring chamber of restrictor valve 168 which communicates with tank return chamber 75. The cushioning pressure from the accumulators 45 and 46 and the cushioning chamber 44a of the cushioning jack 44 is communicated by way of the line 47, a passage 181, a passage 182, the lockout spool 176, a passage 183, a non-return check valve 185, a passage 186, a line 187, a passage 189 and the line 57 to the rod end of the cushioning jack. The passage 186 and hence the accumulator or cushioning pressure is also communicated by way of a passage 190, the lockout spool 176, a passage 192 and a line 193 to the spring chamber 194 of a vent valve 196. The vent valve 196 is a poppet-type valve, somewhat similar to the vent valve 132 of FIG. 3, which is spring biased for closing engagement with a conical seat 197 to block communication between the rod end chamber 44b of the cushioning jack by way of line 57 and the tank return chamber 75. A vent valve actuating piston 198, including an actuating extension 199, is disposed in coaxial alignment with the vent valve 196 for axially urging the vent valve to an open position under the influence of pilot pressure in an actuating chamber 200. The actuating chamber is in communication with the pilot line 55 from selector valve 53 by way of a line 201.

When the system is conditioned for cushion ride, the chamber 194 is vented to tank by way of line 193, passage 192, lockout spool 176, a passage 202, a line 203, a passage 204, an annulus 205, passage 211, return chamber 75 and return port 70.

The line 55 also communicates by way of a passage 206 with an actuating chamber 207 operatively associated with the lockout valve spool 176 for selectively moving the spool to a cushioning position.

The passage 186 also communicates by way of a passage 208 with a high-pressure relief valve 209 to prevent damage from an overpressure condition due to initiation of a lockout condition. When the cushioning jack 44 is allowed to collapse due to a lockout signal, there is an increase in system volume as the piston-rod assembly retracts. If the gas volume of the accumulators 45-46 is insufficient to handle this additional volume, the pressure will become excessive, causing the valve 209 to vent.

OPERATION

While the operation of the present invention is believed clearly apparent from the foregoing description, further amplification will subsequently be made in the following brief summary of such operation. With the vehicle parked and the engine not running, pressure is not available in the circuit and the safety spool 66 is urged by the spring 80 to the position shown in FIG. 3. This vents the accumulators 45 and 46 and the head end of cushioning jack 44 by way of the passage 81, passages 69 and 72 and the check valve 73 to the tank return chamber 75 from where it is communicated to the tank by way of return port 70. In the absence of pressure in the accumulators and the cushioning jack, bracket 35 is permitted to lower until the stop 33a engages the stop 28a on the hitch A-frame 28. Downward movement of the bracket 35 through pivotal action of the links 34 and 35 imparts a force through the leaf spring 156 to move the spool 83 of the leveling valve to the right as viewed in FIG. 3 to a position communicating pump inlet port 77 with the cushioning port 68 by way of passage 103, slots 89 and passage 98. Since the pump is not running and pressure is not available, the hitch will remain in the lowered position.

Under these conditions, the selector valve 53 is disposed in a lockout position as may be more clearly understood with reference to the description in U.S. Pat. No. 3,511,276 mentioned above so that line 55 is vented to the reservoir and line 52 is blocked from communication with the line 55. Under these conditions, the lockout spool 124 assumes the position shown so that vent valve 132 is urged by its spring 134 to the closed position.

When the tractor engine is started, the pump 50 supplies pressure to the line 52 and even though leveling spool 83 is at that point in a position which would raise the hitch, the pump pressure is immediately communicated by way of passage 107, groove 125 of the lockout spool and passage 110 to the chamber 95. The restriction of orifice 112 provides sufficient pressure in that chamber to overcome the bias of the leaf spring 156 and return spool 83 to the neutral position illustrated to vent the pump to the reservoir by way of slots 88, annulus 92 and check valve 73. This establishes a lockout condition wherein the bracket 33 remains in the lowered position until such time as the operator actuates the selector valve 53 to a cushion ride position by manipulation of lever 53a.

Movement of the valve 53 to the cushion ride position communicates pump line 52 with the pilot line 55 to pressurize the lockout valve actuating chamber 129 to urge spool 124 to the right as viewed in FIG. 3. Such movement of the lockout spool blocks communication of the pump pressure to the chamber 95 so that pressure in that chamber is bled to the reservoir at a controlled rate through the passage 111, orifice 112, and passage 113 to permit leaf spring 156 to return the leveling valve to a raise position wherein detent ball 117 engages detent groove 120 in the spool. Movement of lockout spool to the right also engages actuating extension 130 with stem 153 of the poppet valve 148 to open that valve and vent the pressure from the chamber of spring 134. Continued movement of the spool 124 causes the extension 130 to engage the front face of the check valve 132 to urge it to an open position communicating the rod end of the cushioning jack with the reservoir by way of port 140, passage 137, return chamber 75 and return port 70. Communication of the accumulator pressure from line 47 to the rod end of the jack is also blocked as the spool 124 blocks communication between the passage 99 and the passage 127.

Under these conditions and with the leveling spool 83 in a raise detented position as previously described, the pump pressure from line 52 is communicated to the head end of the cushioning jack 44 and the accumulators 45 and 46 to pressurize the cushioning system. That pressure acting on the full area of the piston is effective to raise the bracket 33 and the forward end of the scraper 15 toward a centered or "level" position within its total range of movement wherein the spring force and the weight of the scraper is balanced. As the bracket 33 raises, the pivotal movement of link 35 relaxes the actuating force in leaf spring 156.

The above described action is best explained with reference to FIG. 4 wherein leveling spool displacement relative to hitch displacement is plotted in solid line for movement of the hitch away from a centered or level position toward either extreme of movement with the action of the system as the hitch is returned toward a level position being plotted in dashed lines. For example, with the vehicle engine running and the system in a hitch lowering lockout condition, the leveling stem is disposed at point A in FIG. 4. Since the chamber 95 is pressurized, the leveling spool is displaced to a neutral condition in opposition to the force of spring 156 as depicted at point B. When the selector valve 53 is shifted to a cushion ride position, the leveling spool is returned to a fully actuated position, point A on the graph, so that the hitch will begin to rise as last described. At this point, the spring is deflected and is exerting approximately 75 pounds of force to hold the leveling spool in a raise position for communicating pump pressure to the cushioning circuit. As the hitch reaches approximately point C on the curve, the force of the spring is zero; however, since the spool 83 is held in a raise position by detent 116, the hitch continues to rise. As the hitch reaches a level condition, point D, the force exerted by the spring is approximately 20 pounds and acting in a direction to urge spool 83 toward a neutral position. Since approximately 30 pounds is required to disengage detent ball 117 from the groove 120, the hitch continues to rise to point E at which point the spring force reaches 30 pounds and returns the spool 83 to the neutral position.

The over-leveled condition resulting from the detented raise position of the leveling spool 83 increases the leak-down time or load required to depress the hitch sufficiently to actuate the leveling spool to a raise position. This minimizes cycling of the system and reduces wear and stress on the pump and other hydraulic components.

As load is added to the scraper bowl or the hitch settles due to internal fluid leakage after an extended period of machine operation, the engagement of the ball 117 with the neutral groove 118 is effective to resist movement of the leveling valve until the force in spring 156 reaches approximately 30 pounds. This condition is achieved at point F in the downward direction at which point the spool 83 snaps to a full open position represented at point G. This communicates the pump inlet port 77 by way of passage 103, slots 89 and passage 98 with the cushioning port 68. Such admission of fluid to the cushioning jack and accumulators raises or returns the hitch to the over-leveled condition as previously described and as indicated by point H in FIG. 4.

Figure 4:
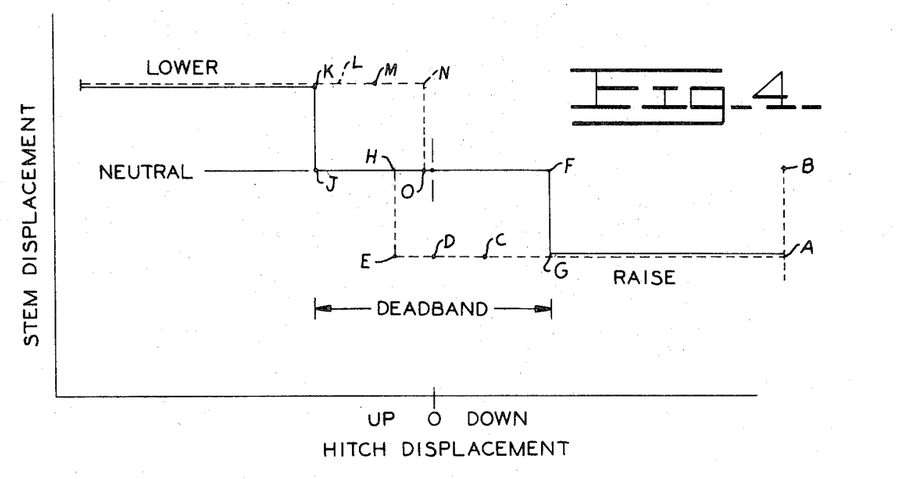
FIG. 4 is a graph illustrating the dead-band area where the control valve remains in its neutral position even though minor up and down relative movements between the tractor and trailer occur in the hitch members.

As load is removed from the scraper the higher pressure which was required to support the load causes the hitch to rise until the force in spring 156 reaches approximately 30 pounds at point J of FIG. 4. This overcomes the detent and moves spool 83 to the left, as viewed in FIG. 3, to a full open or lower position at point K of FIG. 4. This communicates the cushioning end of the jack 44 and the accumulators 45 and 46 to the reservoir by way of the cushioning port 68, passage 98, slots 90, passages 69 and 72, check valve 73, return chamber 75 and return port 70. This is effective to vent fluid from the cushioning system so that the hitch will lower as indicated by broken line L. The spring force is approximately 0 at point M. As the hitch continues to lower to point N the spool is urged toward a neutral condition by the spring 156. At this point the ball engages the ramps 122 and 121 to snap the spool 83 back to a neutral condition just prior to a leveled condition so that the hitch will remain slightly above level at point O of FIG. 4, for the same reason as previously described with respect to point H.

The distance between points F and J of FIG. 4 represents the hitch displacement or "deadband" which can occur without shifting the leveling valve spool 83. This "deadband" absorbs most of the normal dynamic motion of the hitch to minimize actuation of the leveling spool.

When leveling spool 83 is in a neutral condition, the fluid displaced by pump 50 must open restrictor valve 73 to return to the reservoir. This maintains sufficient pressure in the system to overcome the spring 156 and return the leveling spool to a neutral condition when spool 124 is moved to the lockout position for communicating the pump pressure to the chamber 95.

Movement of spool 124 to the lockout position also communicates the accumulators with the rod end of the cushioning jack 44 as previously described to equalize the pressure in the opposite ends of the jack. Although the differential area of the piston provides an unbalanced upward force, the weight of the scraper 15 and the bracket 33 is sufficient to move the piston downwardly until the stop 33a engages the stop 28a. Since the head or cushioning end of the jack is in constant communication with the accumulators, control of the hitch lowering is accomplished solely by the fixed orifice 128.

OPERATION OF SECOND FORM

The alternate embodiment disclosed in FIGS. 5 and 6 functions in a manner very similar to that previously described for FIGS. 2 and 3. However, a brief summary of the operation of that embodiment will be provided to clarify the function of the modified valve of FIG. 6.

With the engine running and the selector valve 53 in a cushion ride position, pilot pressure is available by way of lines 55 and 201 to the actuating chambers 200 and 207 of the vent valve actuating piston 198 and the lockout spool 176. The lockout valve is shifted upwardly as viewed in FIG. 6 to block communication between pump inlet 77 and chamber 95 by way of line 180. This is also effective to block communication between the suspension system and the rod end of cushioning jack 44 by way of line 47, passage 181, lockout spool 176, passage 183, check valve 185, passage 186, line 187, passage 189 and the line 57. Spring chamber 194 communicates by way of the line 193, the passage 192, the lockout spool 176, the passage 202, the line 203, the passage 204, the annulus 205, and the passage 211 to the return chamber 75 from where it is directed to the reservoir by way of the return port 70. This allows upward movement of the actuating piston 198 to urge the vent valve 196 to an open position by contact of the actuating extension 199 with the face of the check valve. This vents the rod end of the cushioning jack 44 to the reservoir by way of return chamber 75 and return port 70.

Pressure in chamber 95 is metered at a controlled rate to the reservoir by way of an orifice 112 and passage 111 to permit the force of spring 162 to return spool 83 to a raised position, as viewed in FIG. 7. This communicates the pump 50 with the cushioning jack chamber 44a and accumulators 45 and 46 by way of restrictor valve 166, leveling spool 83, passage 181 and line 47 to raise the hitch toward the over-leveled condition as disclosed in FIG. 4.

The mechanical deadband and over-leveled condition previously described with respect to FIG. 4 also applies to the alternate embodiment of FIGS. 5 and 6 since the detent 116 cooperates with the spool 83 in exactly the same manner to provide those described conditions.

In view of the foregoing, it is readily apparent that the structure of the present invention provides an improved fluid suspension system and simplified leveling valve to achieve a greatly improved and simplified control for the descent rate of the hitch from a cushion ride to a lockout condition. It further provides direct mechanical actuation of the leveling spool in conjunction with individual spools for each of the other hitch functions and/or modes of operation to permit the use of a greatly simplified valve construction with improved control of the hitch position. It further provides a mechanical spring directly connected to the leveling spool in combination with a mechanical detent to eliminate the need for expensive complicated pilot systems and hydraulic damping devices to provide the deadband desired to avoid excessive energizing of the fluid suspension circuit. This combination also permits the use of an extremely simplified valve to materially reduce costs and yet achieve superior performance of the fluid suspension system.

While the invention has been described and shown with particular reference to the preferred embodiments, it will be apparent that variations might be possible that would fall within the scope of the present invention which is not intended to be limited except as defined in the following claims.

What is claimed is:

1. A hydraulic control valve comprising;
   a valve body having an inlet port, first and second outlet ports and a return port;
   means forming a first passage in said body for communicating said inlet port with said first outlet port and said return port;
   a first valve element movably disposed in said valve body in said first passage for selectively and alternately communicating said inlet port with said first outlet port or said return port;
   means forming a second passage in the body interconnecting said first and second outlet ports;
   a second valve element movably disposed in said valve body in said second passage for selectively controlling communication between said first and second outlet ports;
   means forming a third passage in said body interconnecting said second outlet port and said return port; and
   a third valve element movably disposed in said valve body in said third passage for selectively controlling communication of said second outlet port with said return port and operative to provide such communication when communication between said outlet ports is blocked by said second valve element.

2. The hydraulic control valve of claim 1 including;
   a nonreturn valve disposed between said first and second outlet ports in said second passage to prevent flow of fluid from said second outlet port toward said first outlet port when said second valve element is positioned to permit communication between said first and second outlet ports.

3. The hydraulic control valve of claim 2 including;
   fluid flow restricting means disposed between said first and second outlet ports in said second passage to control the rate of fluid flow from said first outlet port toward said second outlet port when said second valve element is positioned to permit communication between said first and second outlet ports.

4. The hydraulic control valve of claim 2 wherein said second and third valve elements are coaxially arranged, and said second valve element includes actuating extension means for engagement with said third valve element so that movement of said second valve element is mechanically transmitted to said third valve element for selectively controlling communication between said second outlet port and said return port.

5. The hydraulic control valve of claim 2 including;
   first pilot actuating means operatively associated with said second valve element;
   second pilot actuating means operatively associated with said third valve element; and
   pilot passage means interconnecting said first and second pilot actuating means so that said second and third valve elements are simultaneously actuated.

6. The hydraulic control valve of claim 5 wherein said first valve element has a neutral position blocking communication of said first outlet port from said inlet and return ports, a first operative position communicating said first outlet port to said inlet port, a second operative position communicating said first outlet port to said return port;
   resilient linkage means operatively associated with said first valve element for selectively applying a variable force urging said first valve element toward said first or second operative positions; and
   detent/release means for releasably locking said first valve element in said neutral position until said variable force exceeds a predetermined minimum value.

7. The hydraulic control valve of claim 6 including;
   fluid actuating means operatively associated with said first valve element for selectively urging said first valve element from one of said first and second operative positions toward said neutral position;
   means establishing a flow path between said inlet port and said fluid actuating means; and
   pilot valve means disposed in said body in said flow path and responsive to actuation of said second valve element for selectively establishing communication between said inlet port and said fluid actuating means when said second valve element is conditioned to provide communication between said first and second outlet ports whereby pressurization of said fluid actuating means is operative to resist the variable force of said resilient linkage means urging said first valve element toward said one of said operative positions and to return said first valve element to the neutral position.

8. The hydraulic control valve of claim 7 including restrictor valve means disposed in said body in pressure generating relation between said inlet port and said return port to maintain a predetermined pressure in said inlet port when said first valve is conditioned to communicate said inlet port with said return port, said predetermined pressure being of a magnitude to overcome the variable force of said resilient linkage so that said first valve element will be maintained in said neutral position when said pilot valve means is in condition to communicate said inlet port with said fluid actuating means.

9. The hydraulic control valve of claim 8 including;
   a bypass flow path between said first outlet port and said return port; and
   vent valve means reciprocably disposed in said bypass flow path and responsive to pressurization of said inlet port normally to block said bypass flow path and operative automatically to open said bypass flow path due to loss of pressurization in said inlet port.

* * * * *